United States Patent
Ren et al.

(10) Patent No.: US 12,513,671 B2
(45) Date of Patent: Dec. 30, 2025

(54) PHYSICAL DOWNLINK CONTROL CHANNEL MONITORING FOR SUPER SLOTS

(71) Applicant: QUALCOMM Incorporated, San Diego, CA (US)

(72) Inventors: Yuwei Ren, Beijing (CN); Huilin Xu, Temecula, CA (US); Saeid Sahraei, San Diego, CA (US); Gokul Sridharan, Sunnyvale, CA (US); Qiaoyu Li, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 359 days.

(21) Appl. No.: 18/253,895

(22) PCT Filed: Jan. 15, 2021

(86) PCT No.: PCT/CN2021/072129
§ 371 (c)(1),
(2) Date: May 22, 2023

(87) PCT Pub. No.: WO2022/151344
PCT Pub. Date: Jul. 21, 2022

(65) Prior Publication Data
US 2024/0008009 A1    Jan. 4, 2024

(51) Int. Cl.
*H04W 72/0446*    (2023.01)
*H04W 72/232*    (2023.01)
*H04W 72/51*    (2023.01)

(52) U.S. Cl.
CPC ..... *H04W 72/0446* (2013.01); *H04W 72/232* (2023.01); *H04W 72/51* (2023.01)

(58) Field of Classification Search
CPC .......... H04W 72/0446; H04W 72/51; H04W 72/232
See application file for complete search history.

(56) References Cited

U.S. PATENT DOCUMENTS

| | | | |
|---|---|---|---|
| 12,335,965 B2 * | 6/2025 | Gao | H04W 72/1273 |
| 2020/0169991 A1 | 5/2020 | Lin et al. | |
| 2020/0351644 A1 | 11/2020 | Yang et al. | |

FOREIGN PATENT DOCUMENTS

| | | |
|---|---|---|
| CN | 111901876 A | 11/2020 |
| WO | WO-2020072963 A1 | 4/2020 |

(Continued)

OTHER PUBLICATIONS

Huawei: "Summary of Thursday Offline Discussion on PDCCH Enhancements," 3GPP TSG RAN WG1 Meeting #97, R1-1907835, Reno, USA, May 13-17, 2019, May 17, 2019 (May 17, 2019), the whole document, 64 pages.
International Search Report and Written Opinion—PCT/CN2021/072129—ISA/EPO—Oct. 12, 2021.

(Continued)

*Primary Examiner* — Melvin C Marcelo
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a span pattern for a super slot that corresponds to a transmission time interval over multiple slots. The UE may monitor, within a span that is specified by the span pattern and that extends across a slot boundary in the super slot, physical downlink control channel candidates for downlink control information. Numerous other aspects are described.

31 Claims, 16 Drawing Sheets

(56) References Cited

FOREIGN PATENT DOCUMENTS

WO           2020206086 A1    10/2020
WO    WO-2021062843 A1 *   4/2021   ........... H04W 72/23

OTHER PUBLICATIONS

Huawei, et al., "Power Saving for Reduced Capability Devices", 3GPP TSG RAN WG1 Meeting #103-e, R1-2007597, 3rd Generation Partnership Project, Mobile Competence Centre, 650, Route Des Lucioles, F-06921 Sophia-Antipolis Cedex, France, vol. RAn WG1, No. E-meeting, Oct. 26, 2020-Nov. 13, 2020, 11 Pages, Nov. 1, 2020, XP052348952, The whole document.

Supplementary European Search Report—EP21918551—Search Authority—The Hague—Sep. 6, 2024.

Vivo, et al., "Reduced PDCCH Monitoring for Reduced Capability NR Devices", 3GPP TSG RAN WG1 #103-e, R1-2007669, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Oct. 17, 2020, Oct. 17, 2020, 12 Pages, XP051939831, p. 5-p. 6.

Xiaomi: "Required Changes to Physical Layer for NR 52.6-71 GHz", 3GPP TSG RAN WG1 #103, R1-2007642, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, 4 Pages, Oct. 16, 2020, XP051939381, The whole document.

* cited by examiner

PHYSICAL DOWNLINK CONTROL CHANNEL MONITORING FOR SUPER SLOTS

CROSS-REFERENCE TO RELATED APPLICATION

This Patent Application is a 371 national stage of PCT Application No. PCT/CN2021/072129 filed on Jan. 15, 2021, entitled "PHYSICAL DOWNLINK CONTROL CHANNEL MONITORING FOR SUPER SLOTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for physical downlink control channel monitoring for super slots.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving an indication of a span pattern for a super slot that corresponds to a transmission time interval (TTI) over multiple slots, and monitoring, within a span that is specified by the span pattern and that extends across a slot boundary in the super slot, physical downlink control channel (PDCCH) candidates for downlink control information (DCI).

In some aspects, a method of wireless communication performed by a base station includes generating an indication of a span pattern for a super slot that corresponds to a TTI over multiple slots, transmitting the indication of the span pattern to a UE, and transmitting, to the UE in a span that is specified by the span pattern and that extends across a slot boundary in the super slot, PDCCH candidates that include DCI.

In some aspects, a method of wireless communication performed by a UE includes receiving an indication of a PDCCH blind decode (BD) and control channel element (CCE) limit for a super slot that corresponds to a TTI over multiple slots, and monitoring, up to the BD and CCE limit in the super slot, PDCCH candidates or non-overlapped CCEs for DCI.

In some aspects, a method of wireless communication performed by a base station includes generating an indication of a PDCCH BD and CCE limit for a super slot that corresponds to a TTI over multiple slots, transmitting the indication of the BD and CCE limit to a UE, and transmitting, to the UE, a quantity of PDCCH candidates or non-overlapped CCEs based at least in part on the BD and CCE limit.

In some aspects, a UE for wireless communication includes a memory and one or more processors operatively coupled to the memory, the memory and the one or more processors configured to receive an indication of a span pattern for a super slot that corresponds to a TTI over multiple slots, and monitor, within a span that is specified by the span pattern and that extends across a slot boundary in the super slot, PDCCH candidates for DCI.

In some aspects, a base station for wireless communication includes a memory and one or more processors operatively coupled to the memory, the memory and the one or more processors configured to generate an indication of a span pattern for a super slot that corresponds to a TTI over multiple slots, transmit the indication of the span pattern to a UE, and transmit, to the UE in a span that is specified by the span pattern and that extends across a slot boundary in the super slot, PDCCH candidates that include DCI.

In some aspects, a UE for wireless communication includes a memory and one or more processors operatively coupled to the memory, the memory and the one or more processors configured to receive an indication of a PDCCH BD and CCE limit for a super slot that corresponds to a TTI over multiple slots, and monitor, up to the BD and CCE limit in the super slot, PDCCH candidates or non-overlapped CCEs for DCI.

In some aspects, a base station for wireless communication includes a memory and one or more processors operatively coupled to the memory, the memory and the one or more processors configured to generate an indication of a PDCCH BD and CCE limit for a super slot that corresponds to a TTI over multiple slots, transmit the indication of the BD and CCE limit to a UE, and transmit, to the UE, a quantity of PDCCH candidates or non-overlapped CCEs based at least in part on the BD and CCE limit.

In some aspects, a non-transitory computer-readable medium storing a set of instructions for wireless communication includes one or more instructions that, when executed by one or more processors of a UE, cause the UE to receive an indication of a span pattern for a super slot that corresponds to a TTI over multiple slots, and monitor, within a span that is specified by the span pattern and that extends across a slot boundary in the super slot, PDCCH candidates for DCI.

In some aspects, a non-transitory computer-readable medium storing a set of instructions for wireless communication includes one or more instructions that, when executed by one or more processors of a base station, cause the base station to generate an indication of a span pattern for a super slot that corresponds to a TTI over multiple slots, transmit the indication of the span pattern to a UE, and transmit, to the UE in a span that is specified by the span pattern and that extends across a slot boundary in the super slot, PDCCH candidates that include DCI.

In some aspects, a non-transitory computer-readable medium storing a set of instructions for wireless communication includes one or more instructions that, when executed by one or more processors of a UE, cause the UE to receive an indication of a PDCCH BD and CCE limit for a super slot that corresponds to a TTI over multiple slots, and monitor, up to the BD and CCE limit in the super slot, PDCCH candidates or non-overlapped CCEs for DCI.

In some aspects, a non-transitory computer-readable medium storing a set of instructions for wireless communication includes one or more instructions that, when executed by one or more processors of a base station, cause the UE to generate an indication of a PDCCH BD and CCE limit for a super slot that corresponds to a TTI over multiple slots, transmit the indication of the BD and CCE limit to a UE, and transmit, to the UE, a quantity of PDCCH candidates or non-overlapped CCEs based at least in part on the BD and CCE limit.

In some aspects, an apparatus for wireless communication includes means for receiving an indication of a span pattern for a super slot that corresponds to a TTI over multiple slots, and means for monitoring, within a span that is specified by the span pattern and that extends across a slot boundary in the super slot, PDCCH candidates for DCI.

In some aspects, an apparatus for wireless communication includes means for generating an indication of a span pattern for a super slot that corresponds to a TTI over multiple slots, means for transmitting the indication of the span pattern to a UE, and means for transmitting, to the UE in a span that is specified by the span pattern and that extends across a slot boundary in the super slot, PDCCH candidates that include DCI.

In some aspects, an apparatus for wireless communication includes means for receiving an indication of a PDCCH BD and CCE limit for a super slot that corresponds to a TTI over multiple slots, and means for monitoring, up to the BD and CCE limit in the super slot, PDCCH candidates or non-overlapped CCEs for DCI.

In some aspects, an apparatus for wireless communication includes means for generating an indication of a PDCCH BD and CCE limit for a super slot that corresponds to a TTI over multiple slots, means for transmitting the indication of the BD and CCE limit to a UE, and means for transmitting, to the UE, a quantity of PDCCH candidates or non-overlapped CCEs based at least in part on the BD and CCE limit.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
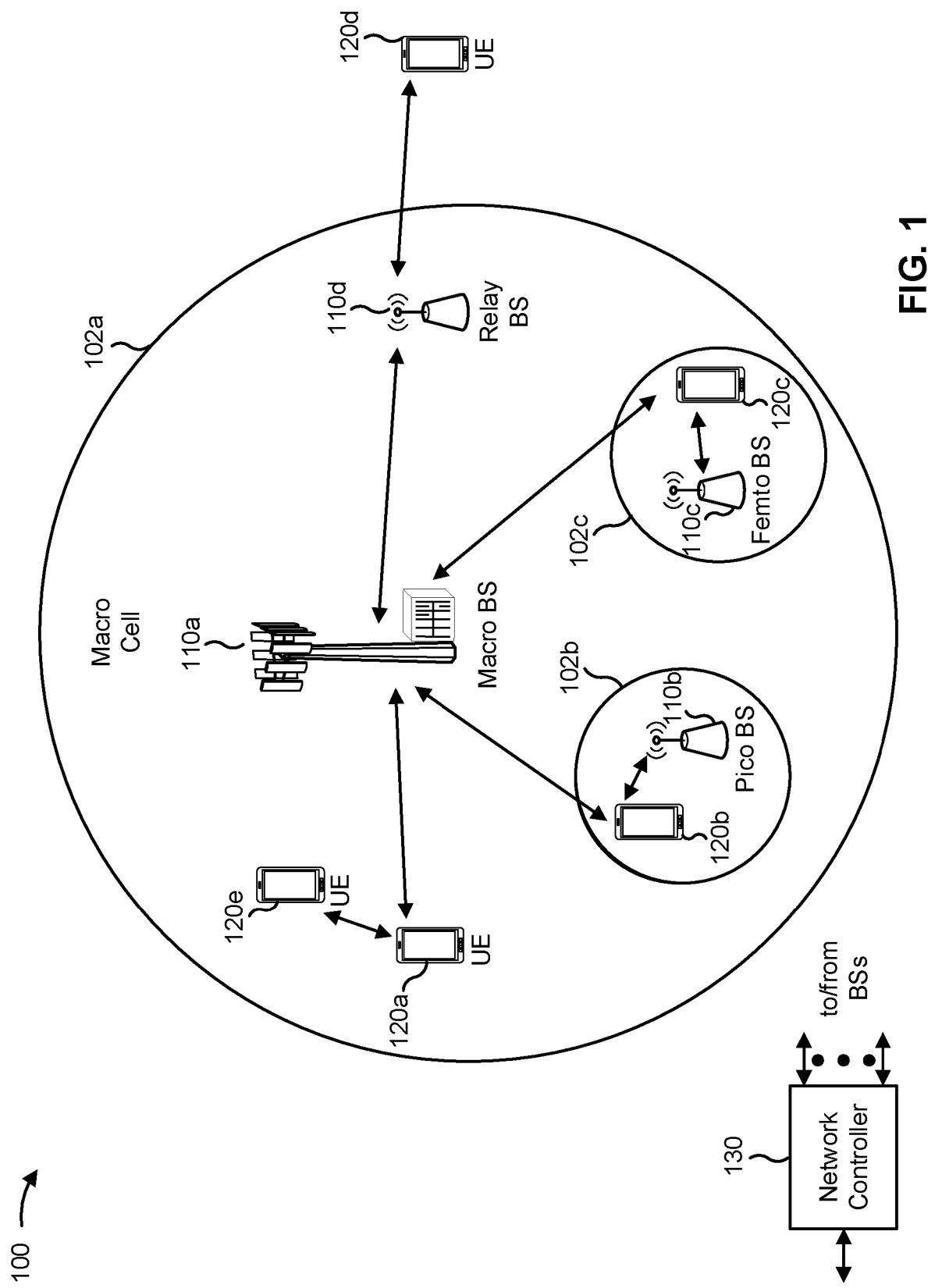
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
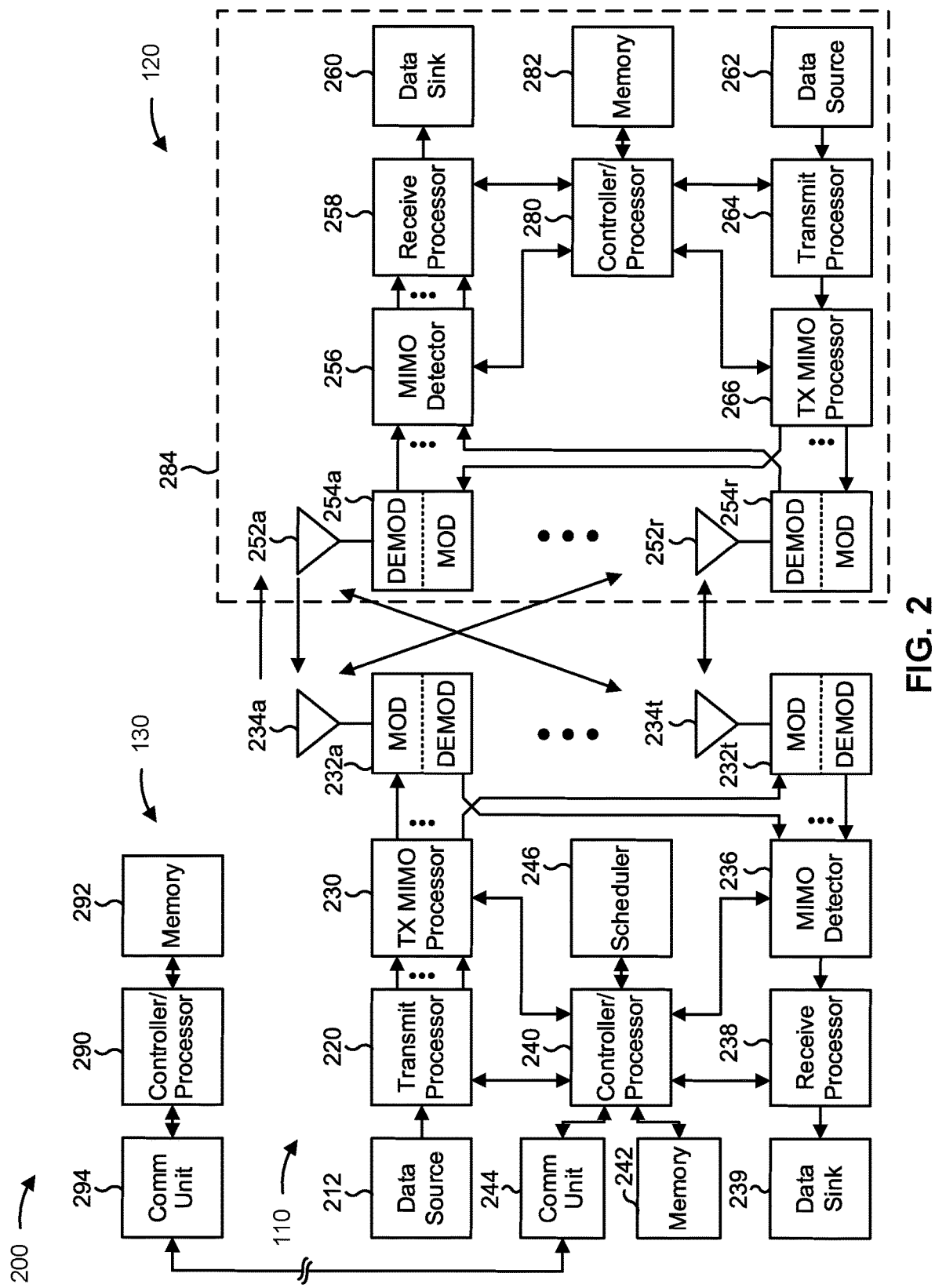
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-16.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-16.

Controller/processor 240 of base station 110, controller/processor 280 of UE 120, and/or any other component(s) of FIG. 2 may perform one or more techniques associated with physical downlink control channel (PDCCH) monitoring for super slots, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 includes means for receiving an indication of a span pattern for a super slot that corresponds to a transmission time interval (TTI) over multiple slots, and/or means for monitoring, within a span that is specified by the span pattern and that extends across a slot boundary in the super slot, PDCCH candidates for downlink control information (DCI). The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for transmitting a capability of the UE for a span pattern.

In some aspects, base station 110 includes means for generating an indication of a span pattern for a super slot that corresponds to a TTI over multiple slots, means for transmitting the indication of the span pattern to a UE, and/or or means for transmitting, to the UE in a span that is specified by the span pattern and that extends across a slot boundary in the super slot, PDCCH candidates that include DCI. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, UE 120 includes means for receiving an indication of a PDCCH blind decode (BD) and control channel element (CCE) limit for a super slot that corresponds to a TTI over multiple slots, and/or means for monitoring, up to the BD and CCE limit in the super slot, PDCCH candidates or non-overlapped CCEs for DCI. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for transmitting an indication of a capability of the UE for a BD and CCE limit.

In some aspects, base station 110 includes means for generating an indication of a PDCCH BD and CCE limit for a super slot that corresponds to a TTI over multiple slots, means for transmitting the indication of the BD and CCE limit to a UE, and/or means for transmitting, to the UE, a quantity of PDCCH candidates or non-overlapped CCEs based at least in part on the BD and CCE limit. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

As indicated above, FIG. 2 is provided as an example. Other examples may differ from what is described with regard to FIG. 2.

Figure 3:
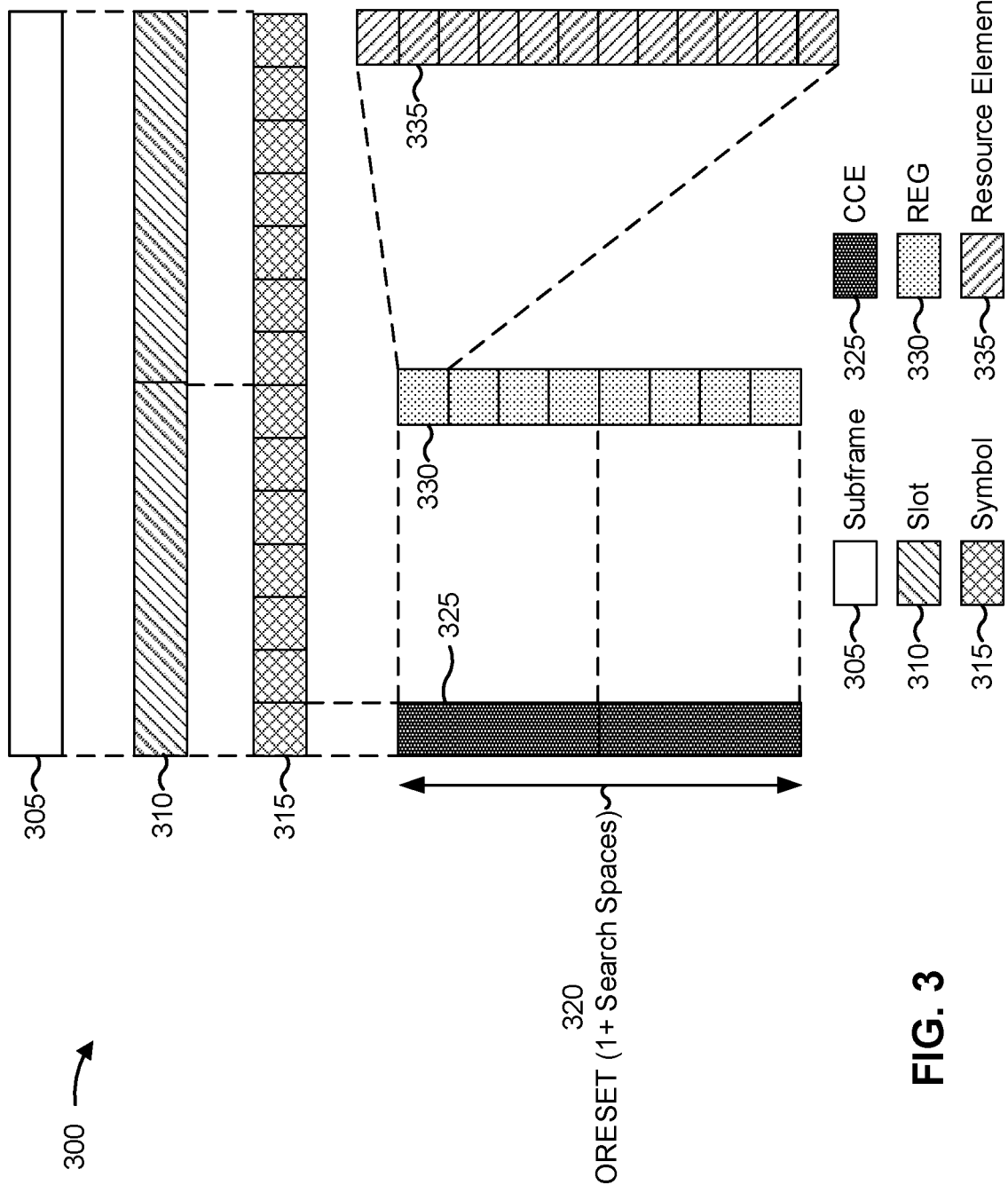
FIG. 3 is a diagram illustrating an example resource structure for wireless communication, in accordance with various aspects of the present disclosure.

FIG. 3 is a diagram illustrating an example resource structure 300 for wireless communication, in accordance with various aspects of the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different number of slots may be included in a subframe (e.g., 4 slots, 8 slots, 16 slots, 32 slots, or another quantity of slots). In some aspects, different types of TTIs may be used, other than subframes and/or slots. A slot 310 may include multiple symbols 315, such as 14 symbols per slot.

The potential control region of a slot 310 may be referred to as a control resource set (CORESET) 320 and may be structured to support an efficient use of resources, such as by flexible configuration or reconfiguration of resources of the CORESET 320 for one or more PDCCHs and/or one or more physical downlink shared channels (PDSCHs). In some aspects, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (e.g., a quantity of resource blocks) and/or a time domain region (e.g., a quantity of symbols) for the CORESET 320.

As illustrated, a symbol 315 that includes CORESET 320 may include one or more CCEs 325, shown as two CCEs 325 as an example, that span a portion of the system bandwidth. A CCE 325 may include DCI that is used to provide control information for wireless communication. A base station may transmit DCI during multiple CCEs 325 (as shown), where the quantity of CCEs 325 used for transmission of DCI represents the aggregation level (AL) used by the BS for the transmission of DCI. In FIG. 3, an aggregation level of 2 is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some aspects, the quantity of REGs 330 included in a CCE 325 may be specified by a REG bundle size. A REG 330 may include one resource block, which may include 12 resource elements (REs) 335 within a symbol 315. A resource element 335 may occupy one subcarrier in the frequency domain and one OFDM symbol in the time domain.

A search space may include all possible locations (e.g., in time and/or frequency) where a PDCCH may be located. A CORESET 320 may include one or more search spaces, such as a UE-specific search space, a group-common search space, and/or a common search space. A search space may indicate a set of CCE locations where a UE may find PDCCHs that can potentially be used to transmit control information to the UE. The possible locations for a PDCCH may depend on whether the PDCCH is a UE-specific PDCCH (e.g., for a single UE) or a group-common PDCCH (e.g., for multiple UEs) and/or an aggregation level being used. A possible location (e.g., in time and/or frequency) for a PDCCH may be referred to as a PDCCH candidate, and the set of all possible PDCCH locations at an aggregation level may be referred to as a search space. For example, the set of all possible PDCCH locations for a particular UE may be referred to as a UE-specific search space. Similarly, the set of all possible PDCCH locations across all UEs may be referred to as a common search space. The set of all possible PDCCH locations for a particular group of UEs may be referred to as a group-common search space. One or more search spaces across aggregation levels may be referred to as a search space (SS) set.

An SS set may have a time domain location (e.g., periodicity, consecutive slots in the periodicity, starting symbols in the slot, aggregation level) that corresponds to a PDCCH monitoring occasion. A PDCCH monitoring occasion may be an SS occasion. A UE may be configured with up to 3 CORESETs and 10 SS sets in each bandwidth part. A CORESET and a SS set may jointly specify resources where the PDCCH is monitored. A CORESET can be associated with multiple SS sets. A PDCCH candidate may occupy all symbols of a monitoring occasion within RB range of CCEs allocated to the PDCCH candidate.

A CORESET 320 may be interleaved or non-interleaved. An interleaved CORESET 320 may have CCE-to-REG mapping such that adjacent CCEs are mapped to scattered REG bundles in the frequency domain (e.g., adjacent CCEs are not mapped to consecutive REG bundles of the CORESET 320). A non-interleaved CORESET 320 may have a CCE-to-REG mapping such that all CCEs are mapped to consecutive REG bundles (e.g., in the frequency domain) of the CORESET 320.

As indicated above, FIG. 3 is provided as an example. Other examples may differ from what is described with respect to FIG. 3.

Figure 4:
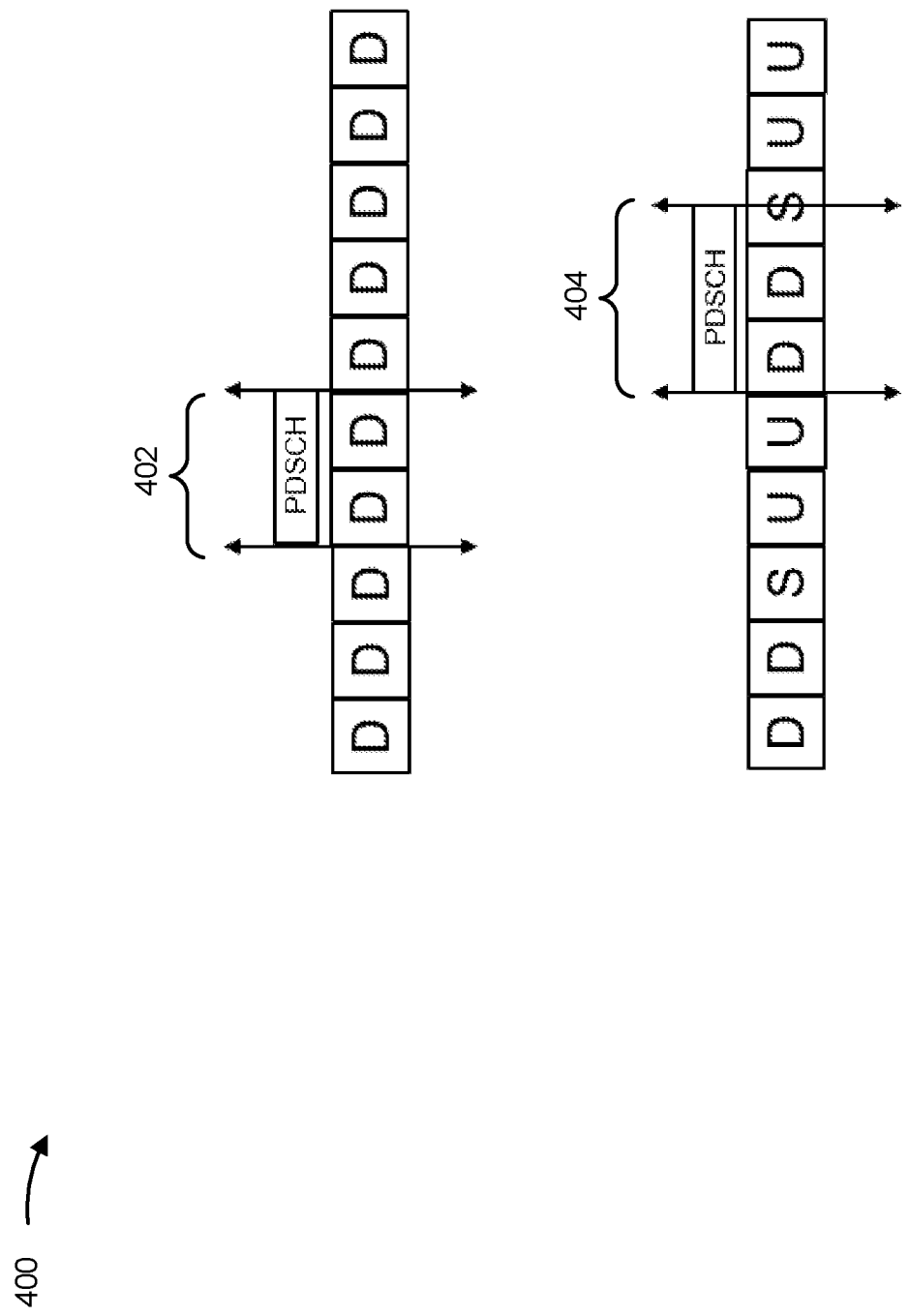
FIG. 4 is a diagram illustrating an example of super slots, in accordance with various aspects of the present disclosure.

FIG. 4 is a diagram illustrating an example 400 of super slots, in accordance with various aspects of the present disclosure.

Enhanced slot aggregation includes enhancements that pertain to a slot size or a slot boundary. Such enhancements may include how repetitions are handled at a slot boundary, multi-slot transport block processing, and cross-slot channel estimation. These enhancements and other issues have led to the introduction of a "super slot" that corresponds to a TTI over multiple continuous slots or indicated symbols that cross slot boundaries. FIG. 4 shows super slots 402 and 404 for the PDSCH. Super slots may extend over multiple slots, including over a portion of a slot (slot 404). The super slot may apply to both uplink and downlink. Super slots may improve channel estimation by leveraging multiple DMRS symbols over a greater amount of time. Super slots may also enable further optimization of DMRS density and reduction of DMRS overhead. For example, DMRSs may be redesigned to spread out over multiple slots, and larger transport block sizes provide for coding gains.

As indicated above, FIG. 4 is provided as an example. Other examples may differ from what is described with regard to FIG. 4.

Figure 5:
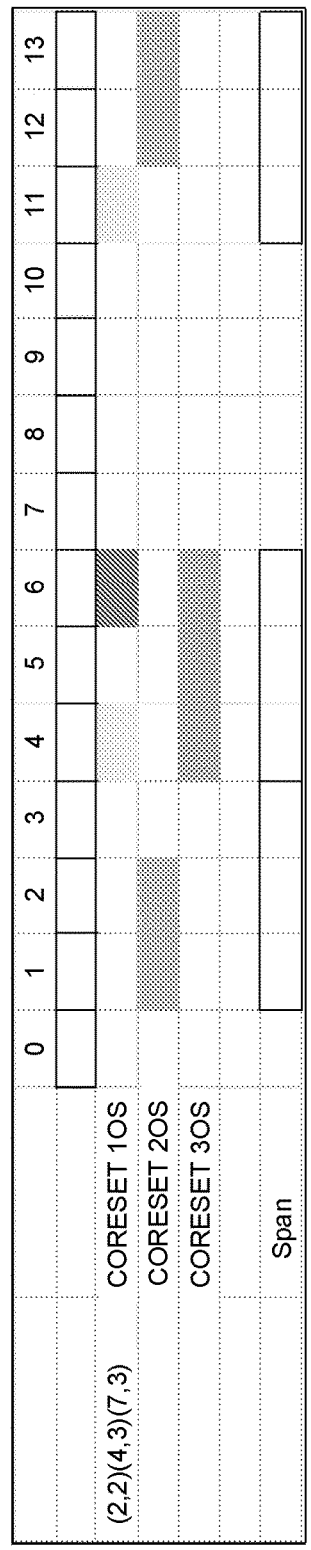
FIG. 5 is a diagram illustrating an example of spans for monitoring a control channel, in accordance with various aspects of the present disclosure.
Figure 5:
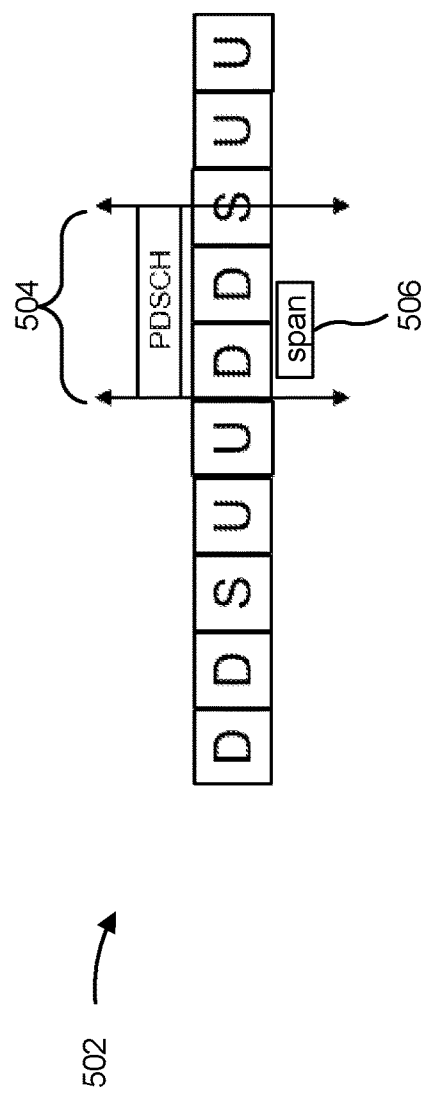

FIG. 5 is a diagram illustrating examples 500 and 502 of spans for monitoring a control channel, in accordance with various aspects of the present disclosure.

A span may include 1, 2, or 3 symbols and a monitoring occasion may be within the span. Example 500 shows spans for monitoring a PDCCH. A PDCCH span may be a UE capability or part of a UE feature list. Different configurations may have different span values. Example 500 shows three candidate value sets (X, Y), which are shown as pairs {(7, 3), (4, 3), (2, 2)}. X is a minimum gap between the start of two spans, and Y is a duration of the span. A UE may select one, two, or all three pairs. Example 500 shows the UE reporting all three pairs.

Example 500 shows three CORESETS configured with different durations. A span may include a CORESET, and a span duration may be the greater of a maximum CORESET duration or a minimum value of Y. In example 500, a span start separation may be at least 2 symbols, because of the reported (2, 2) pair.

In current designs for monitoring a PDCCH, each monitoring occasion is fully contained in one span, and the span definition is per slot and not crossing slot boundaries. Current designs do not support a monitoring occasion that crosses a slot boundary. However, a UE may need to support monitoring of a PDCCH in any symbol of a slot while still monitoring within a single span.

While there is a restriction that a PDCCH monitoring occasion should be in one slot, located within the slot boundary, there is also a restriction on a quantity of BDs and CCEs per slot. BDs may be referred to as "monitored PDCCH candidates" and CCEs may be referred to as "non-overlapped CCEs." A current BD and CCE limit may be between 20-44 monitored PDCCH candidates or between 32 and 56 non-overlapped CCEs, depending on a subcarrier spacing (SCS) configuration and/or span pair values. Restrictions on monitoring within a slot and a BD and CCE limit involve inefficiencies that cause the UE to waste processing and signaling resources if super slots are configured for PDCCH.

According to various aspects described herein, a UE may be configured to monitor for PDCCH candidates in a span that crosses slot boundaries within a super slot. This may involve new PDCCH configurations for spans. For example, a UE may receive an indication of a span pattern, which may include a span duration and a minimum span separation gap or span interval. The span may no longer be restricted to 3 symbols. The span may exceed 3 symbols, exceed a slot size (14 symbols), and/or extend across multiple slots with the super slot. Example 502 shows a super slot 504 with a span 506 that is not limited to a slot and that crosses slot boundaries. A span duration and/or the minimum span separation gap may correspond to a length of the super slot. The span duration and/or the minimum span separation gap may be limited by a UE capability level. A span duration for a premium UE may be greater than a span duration for a low-tier or reduced capacity UE. For example, a premium UE may support a span duration of 10 continuous symbols or less, a medium UE may support a span duration of 7 continuous symbols or less, and a low-tier UE may support a span duration of 5 continuous symbols or less. Note that each of these limits exceeds a current 3 symbol limit for a span. The new span patterns for a super slot may enhance coverage, can be easily configured for PDCCH monitoring, and may reduce actions the UE takes for PDCCH reception, which reduces overhead and conserves processing resources and signaling resources.

As indicated above, FIG. 5 provides some examples. Other examples may differ from what is described with regard to FIG. 5.

Figure 6:
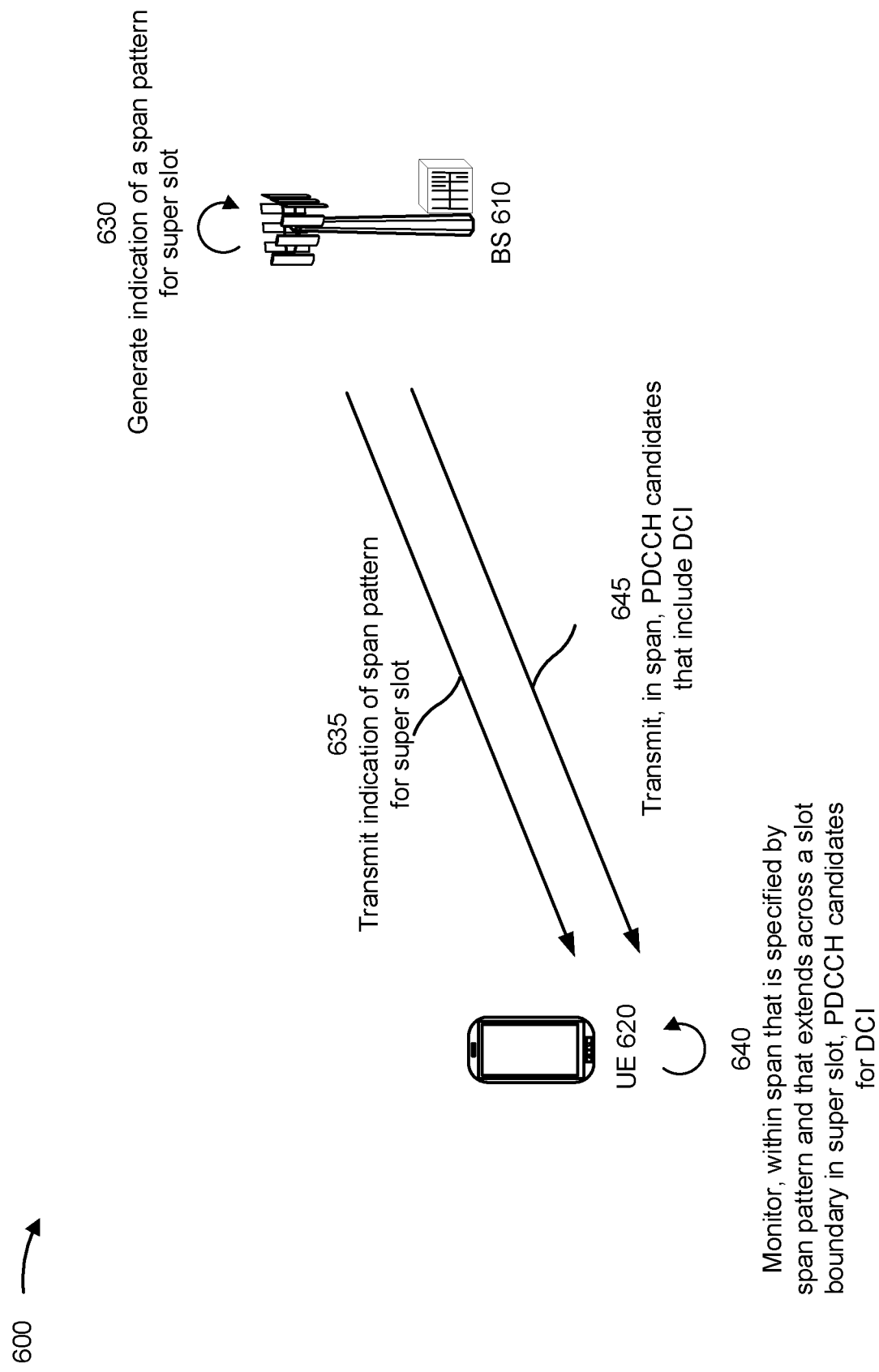
FIG. 6 is a diagram illustrating an example of indicating a span pattern, in accordance with various aspects of the present disclosure.

FIG. 6 is a diagram illustrating an example 600 of indicating a span pattern, in accordance with various aspects of the present disclosure. As shown in FIG. 6, example 600 includes communications between BS 610 (e.g., a BS 110 depicted in FIGS. 1 and 2) and a UE 620 (e.g., a UE 120 depicted in FIGS. 1 and 2). In some aspects, BS 610 and UE 620 may be included in a wireless network, such as wireless network 100. BS 610 and UE 620 may communicate on wireless access links, which may include an uplink and a downlink.

UE 620 may be configured to monitor for DCI in PDCCH candidates. UE 620 may monitor within spans of a super slot. As shown by reference number 630, BS 610 may generate an indication of a span pattern for a super slot. The span pattern may indicate a span duration that is greater than 3 symbols or greater than a slot. The span pattern may also indicate a minimum span separation gap. BS 610 may determine the span pattern for UE 620 based at least in part on a capability report from UE 620 that indicates a capability of UE 620 to support different PDCCH configurations for a super slot, such as the various aspects described herein.

As shown by reference number 635, BS 610 may transmit the indication to UE 620. As shown by reference number 640, UE 620 may monitor PDCCH candidates or non-overlapped CCEs for DCI within a span that is specified by the span pattern. UE 620 may use a span pattern in which spans cross slot boundaries. As shown by reference number 645, BS 610 may transmit the PDCCH candidates or non-overlapped CCEs in each span. UE 620 may obtain the DCI. By extending monitoring occasions in spans in size and across slot boundaries in a super slot, UE 620 may better adapt to different PDCCH configurations while not consuming processing resources and signaling resources on additional overhead.

As indicated above, FIG. 6 is provided as an example. Other examples may differ from what is described with regard to FIG. 6.

Figure 7:
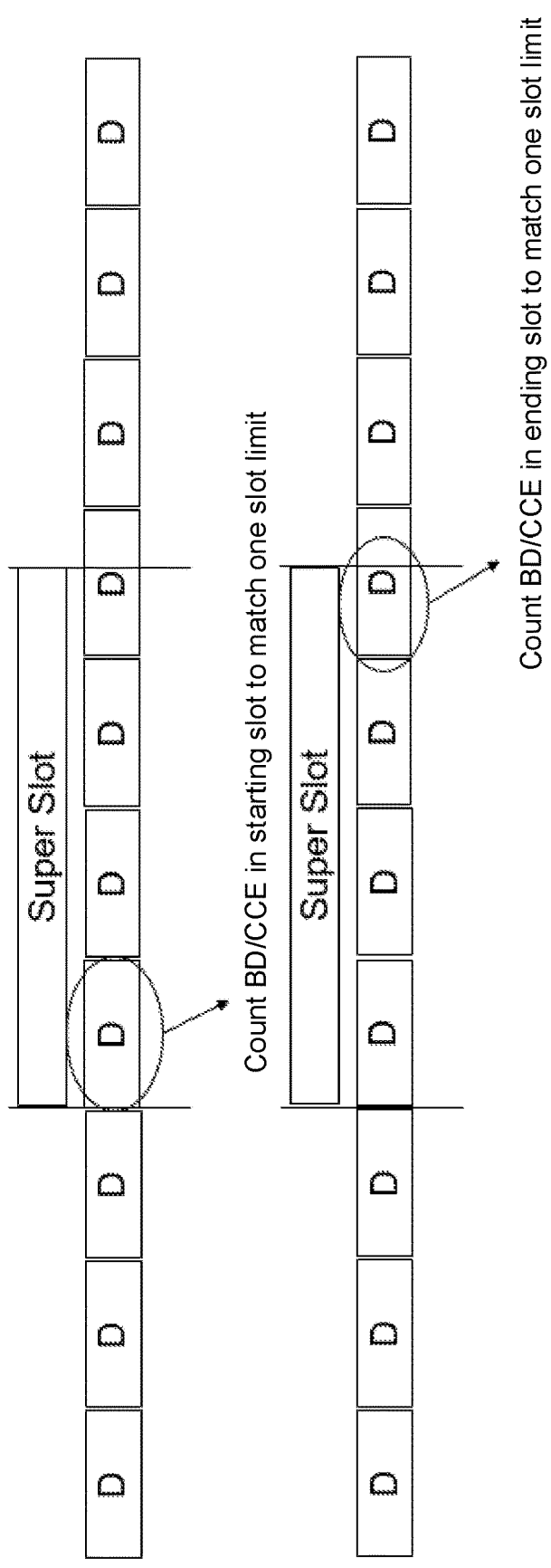
FIG. 7 is a diagram illustrating an example of super slots with a blind decode (BD) and control channel element (CCE) limit, in accordance with various aspects of the present disclosure.

FIG. 7 is a diagram illustrating an example 700 of super slots with a BD and CCE limit, in accordance with various aspects of the present disclosure.

A UE may be configured with a PDCCH BD and CCE limit. The BD and CCE limit may specify a maximum number of monitored PDCCH candidates or non-overlapped CCEs that the UE may monitor for in a slot. The BD and CCE limit may be per serving cell. As the BD and CCE limit is per slot, the current BD and CCE limits may be too restrictive for a super slot. Unless this restriction is changed, the UE may not obtain DCI in a reasonable amount of time and thus the UE may waste processing resources and signaling resources using additional overhead to monitor for DCI in multiple monitoring occasions.

According to various aspects described herein, a UE may be configured with a multi-slot BD and CCE limit for a super slot. In some aspects, the BD and CCE limit may apply for an entire super slot. For example, a maximum number of monitored PDCCH candidates or non-overlapped CCEs may be between 20 and 44 (depending on SCS) for a regular slot but between 40 and 80 (depending on SCS) for a super slot. There may be more opportunities for the UE to obtain DCI, and if the opportunities are spread out, there may be less overhead. In some aspects, the BD and CCE limit may also be counted in each consecutive slot that forms the super slot.

The BD and CCE limit may be separately defined for enhanced mobile broadband (eMBB) devices and ultra-reliable low-latency communication (URLLC) devices. That is, the BD and CCE limit may correspond to a UE capability. The BD and CCE limit may also correspond to a length of the super slot.

In some aspects, rather than applying a BD and CCE limit to an entire super slot or to each slot of the super slot, a UE may apply the BD and CCE limit to only one slot of the super slot. Example 700 shows examples of the one slot being a starting slot or an ending slot. If the BD and CCE limit applies to only one slot, such as the starting slot, the BD and CCE limit may not apply to the remaining slots. This means that the UE may not monitor the PDCCH for DCI in the remaining slots. In this way, the UE may obtain DCI for the super slot in a first slot and conserve processing and signaling resources by not monitoring for the DCI in multiple other slots. The UE may receive an indication of the BD and CCE limit to apply to the super slot or to apply to the one slot.

In some aspects, the UE may split a BD and CCE limit for a super slot equally among slots of the super slot. For example, if a BD and CCE limit is N PDCCH candidates or CCEs for a super slot formed by 4 slots, the BD and CCE limit for each slot is N/4 candidates or CCEs. In some aspects, the split may be proportional and according to a number of symbols occupied by a PDCCH candidate in each slot. For example, if a super slot includes 50 symbols in 4 slots of [14, 14, 12, 10] symbols, the BD and CCE limit limitation for each slot may be [N/50*14, N/50*14, N/50*12, N/50*10]. Such BD and CCE limits may depend on a UE capability, which the UE may report to the network. By using these multiple configurations for a BD and CCE limit, a UE may have more flexibility to monitor for DCI and may conserve processing resources and signaling resources by using less over head or by not monitoring more candidates or CCEs than necessary.

As indicated above, FIG. 7 is provided as an example. Other examples may differ from what is described with regard to FIG. 7.

Figure 8:
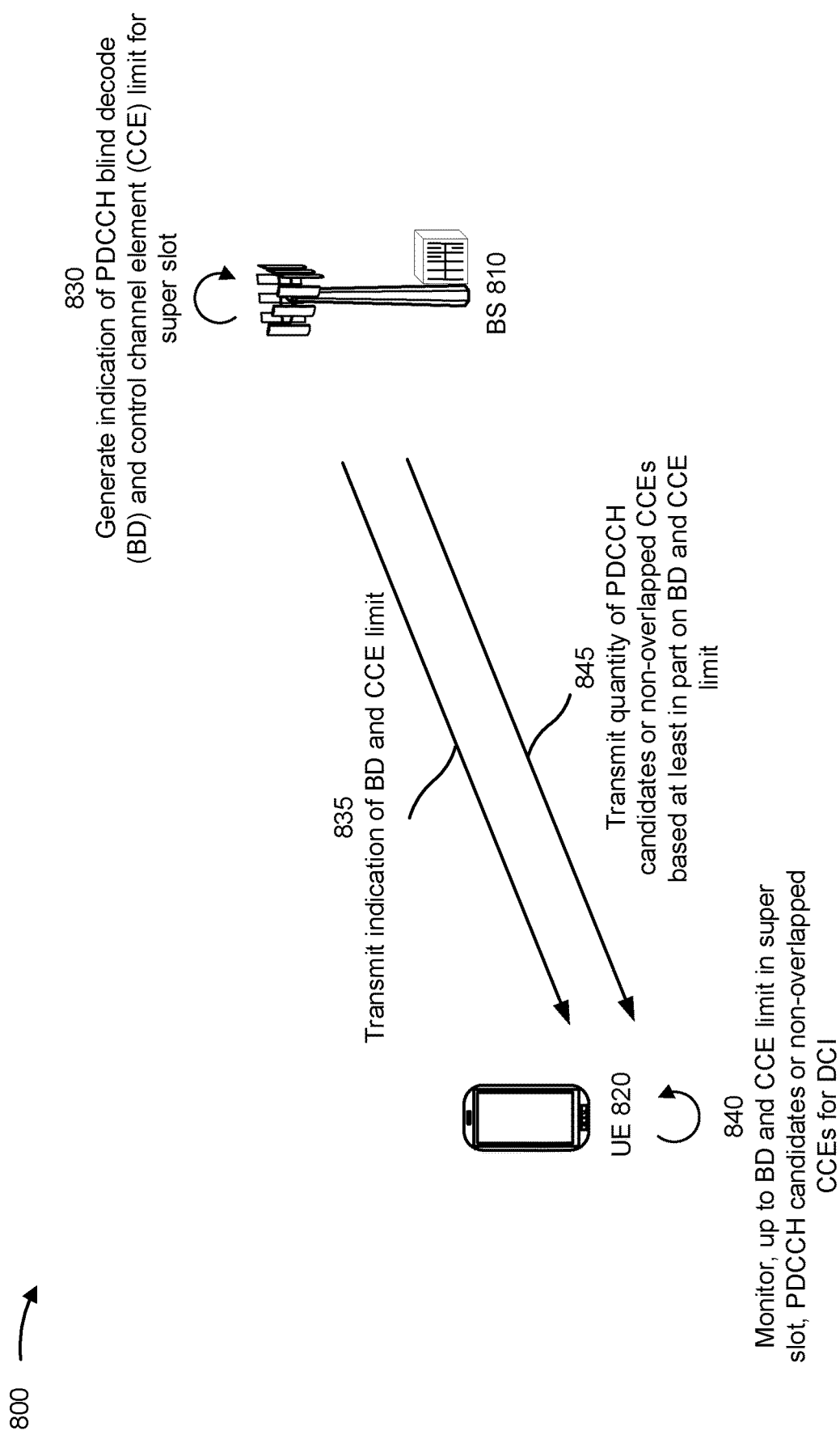
FIG. 8 is a diagram illustrating an example of indicating a BD and CCE limit, in accordance with various aspects of the present disclosure.

FIG. 8 is a diagram illustrating an example 800 of indicating a BD and CCE limit, in accordance with various aspects of the present disclosure. As shown in FIG. 8, example 800 includes communications between BS 810 (e.g., a BS 110 depicted in FIGS. 1 and 2) and a UE 820 (e.g., a UE 120 depicted in FIGS. 1 and 2). In some aspects, BS 810 and UE 820 may be included in a wireless network, such as wireless network 100. BS 810 and UE 820 may communicate on wireless access links, which may include an uplink and a downlink.

UE 820 may be configured to monitor for DCI in monitored PDCCH candidates or non-overlapped CCEs up to a limited number of monitored PDCCH candidates or non-overlapped CCEs per slot or per super slot. As shown by reference number 830, BS 810 may generate an indication of a BD and CCE limit. BS 810 may determine the BD and CCE limit for UE 820 based at least in part on a capability report from UE 820 that indicates a capability of UE 820 to support different PDCCH configurations for a super slot, such as the various aspects described herein.

As shown by reference number 835, BS 810 may transmit the indication to UE 820. As shown by reference number 840, UE 820 may monitor PDCCH candidates or non-overlapped CCEs for DCI up to the BD and CCE limit, whether the limit applies to the entire super slot, a first slot, a last slot, a specific slot, or each slot. As shown by reference number 845, BS 810 may transmit the monitored PDCCH candidates or non-overlapped CCEs. BS 810 may transmit an appropriate number of monitored PDCCH candidates or non-overlapped CCEs per slot. UE 820 may obtain the DCI.

As indicated above, FIG. 8 is provided as an example. Other examples may differ from what is described with regard to FIG. 8.

Figure 9:
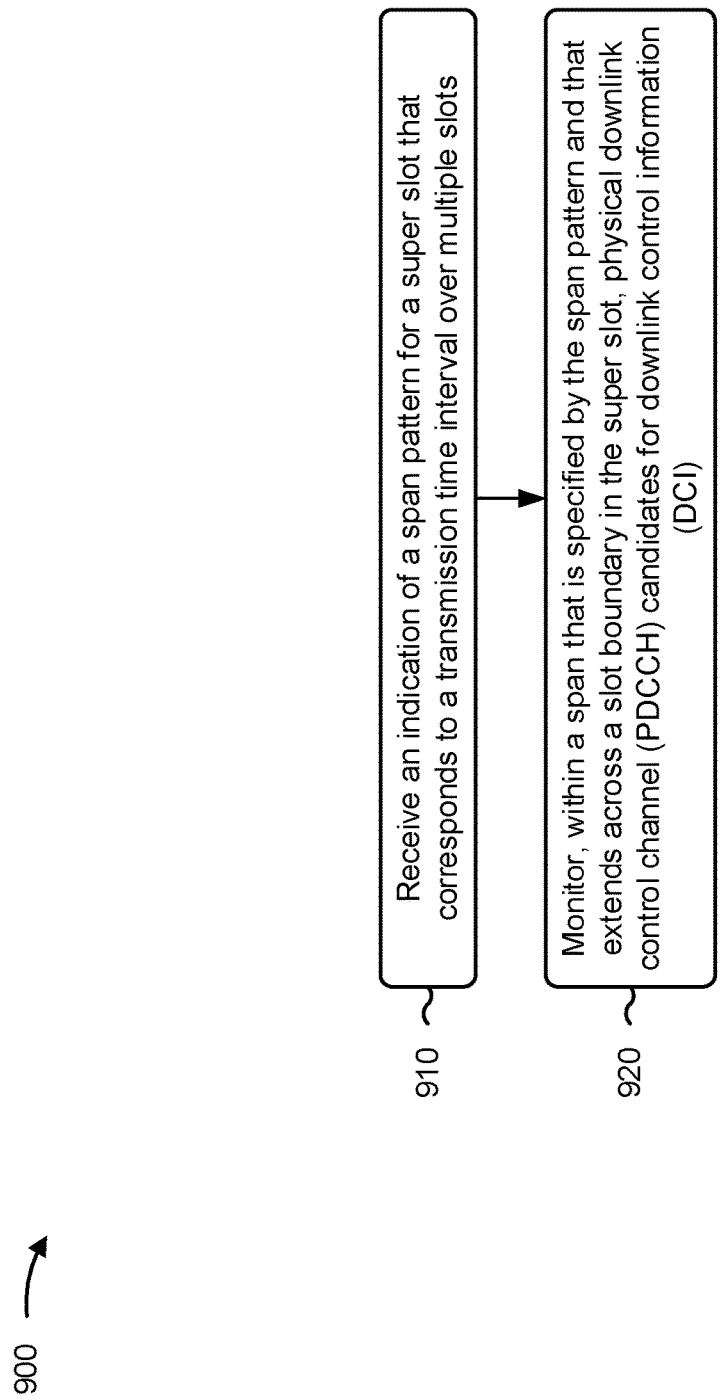
FIG. 9 is a diagram illustrating an example process performed, for example, by a UE, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 depicted in FIGS. 1-2, UE 620 depicted in FIG. 6) performs operations associated with PDCCH monitoring.

As shown in FIG. 9, in some aspects, process 900 may include receiving an indication of a span pattern for a super slot that corresponds to a TTI over multiple slots (block 910). For example, the UE (e.g., using reception component 1302 depicted in FIG. 13) may receive an indication of a span pattern for a super slot that corresponds to a TTI over multiple slots, as described above.

As further shown in FIG. 9, in some aspects, process 900 may include monitoring, within a span that is specified by the span pattern and that extends across a slot boundary in the super slot, PDCCH candidates for DCI (block 920). For example, the UE (e.g., using monitoring component 1308 depicted in FIG. 13) may monitor, within a span that is specified by the span pattern and that extends across a slot boundary in the super slot, PDCCH candidates for DCI, as described above. In some aspects, monitoring PDCCH candidates includes monitoring non-overlapped CCEs.

Process 900 may include additional aspects, such as any single aspect or any combination of aspects described below and/or in connection with one or more other processes described elsewhere herein.

In a first aspect, the span pattern includes a span duration and a minimum span separation gap.

In a second aspect, alone or in combination with the first aspect, the span duration is greater than 3 symbols.

In a third aspect, alone or in combination with one or more of the first and second aspects, the span duration is greater than a length of a slot.

In a fourth aspect, alone or in combination with one or more of the first through third aspects, the span duration or the minimum span separation gap corresponds to a length of the super slot.

In a fifth aspect, alone or in combination with one or more of the first through fourth aspects, the span duration or the minimum span separation gap corresponds to a capability level of the UE.

In a sixth aspect, alone or in combination with one or more of the first through fifth aspects, process 900 includes transmitting a capability of the UE for a span pattern.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
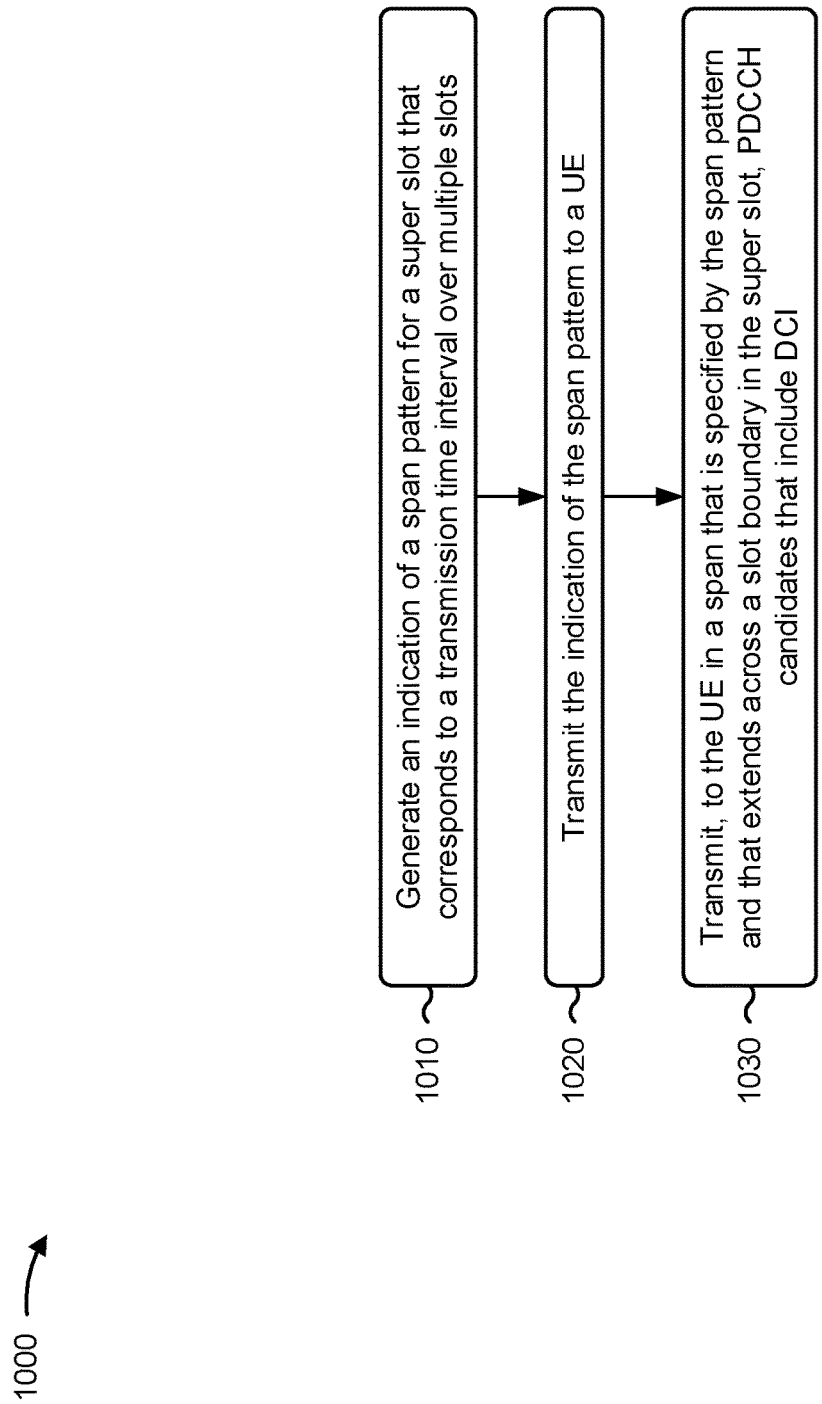
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where the base station (e.g., base station 110 depicted in FIGS. 1-2) performs operations associated with PDCCH monitoring.

As shown in FIG. 10, in some aspects, process 1000 may include generating an indication of a span pattern for a super slot that corresponds to a TTI over multiple slots (block 1010). For example, the base station (e.g., using generation component 1408 depicted in FIG. 14) may generate an indication of a span pattern for a super slot that corresponds to a TTI over multiple slots, as described above.

As further shown in FIG. 10, in some aspects, process 1000 may include transmitting the indication of the span pattern to a UE (block 1020). For example, the base station (e.g., using transmission component 1404 depicted in FIG. 14) may transmit the indication of the span pattern to a UE, as described above.

As further shown in FIG. 10, in some aspects, process 1000 may include transmitting, to the UE in a span that is specified by the span pattern and that extends across a slot boundary in the super slot, PDCCH candidates that include DCI (block 1030). For example, the base station (e.g., using transmission component 1404 depicted in FIG. 14) may transmit, to the UE in a span that is specified by the span pattern and that extends across a slot boundary in the super slot, PDCCH candidates that include DCI, as described above.

Process 1000 may include additional aspects, such as any single aspect or any combination of aspects described below and/or in connection with one or more other processes described elsewhere herein.

In a first aspect, the span pattern includes a span duration and a minimum span separation gap.

In a second aspect, alone or in combination with the first aspect, the span duration is greater than 3 symbols.

In a third aspect, alone or in combination with one or more of the first and second aspects, the span duration is greater than a length of a slot.

In a fourth aspect, alone or in combination with one or more of the first through third aspects, the span duration or the minimum span separation gap corresponds to a length of the super slot.

In a fifth aspect, alone or in combination with one or more of the first through fourth aspects, the span duration or the minimum span separation gap is based at least in part on an indication of a capability level of the UE that is received from the UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
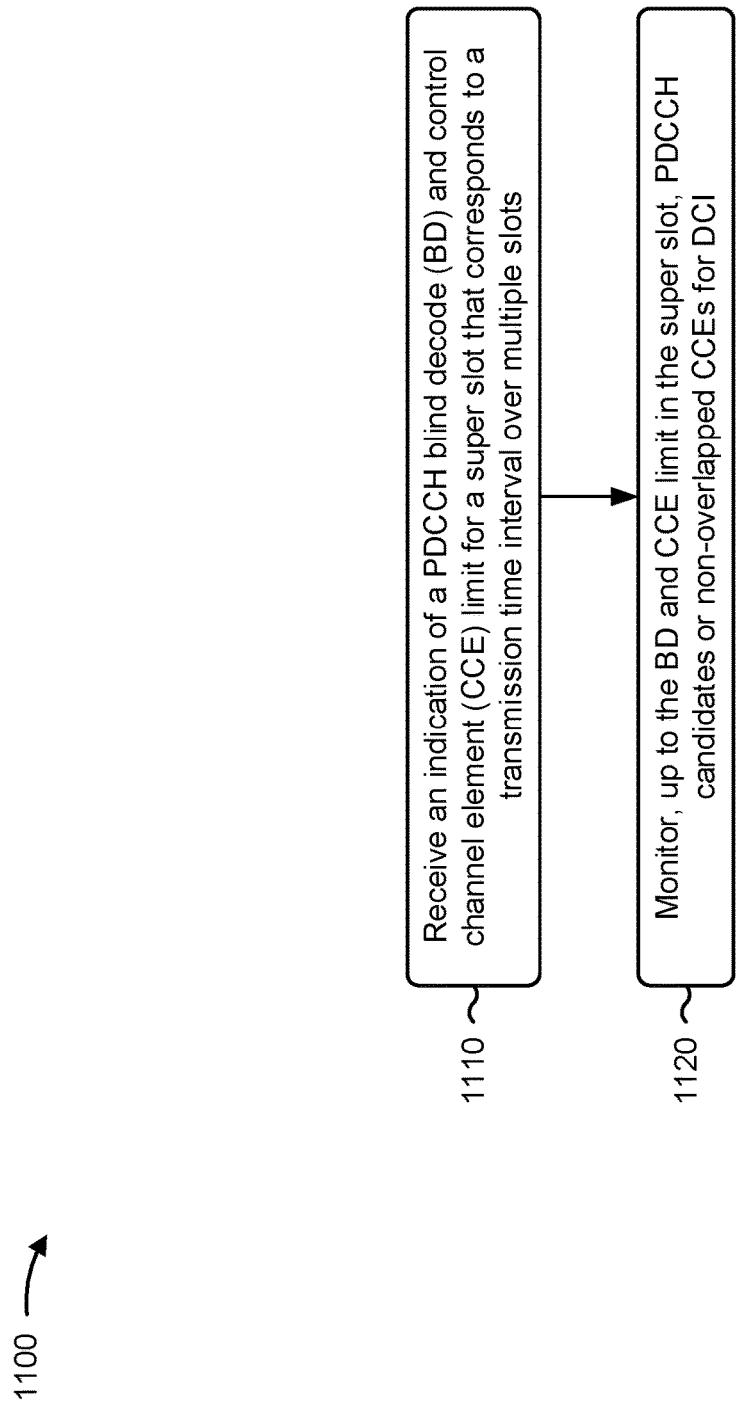
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120 depicted in FIGS. 1-2, UE 820 depicted in FIG. 8) performs operations associated with PDCCH monitoring.

As shown in FIG. 11, in some aspects, process 1100 may include receiving an indication of a PDCCH BD and CCE limit for a super slot that corresponds to a TTI over multiple slots (block 1110). For example, the UE (e.g., using reception component 1602 depicted in FIG. 16) may receive an indication of a PDCCH BD and CCE limit for a super slot that corresponds to a TTI over multiple slots, as described above.

As further shown in FIG. 11, in some aspects, process 1100 may include monitoring, up to the BD and CCE limit in the super slot, PDCCH candidates or non-overlapped CCEs for DCI (block 1120). For example, the UE (e.g., using monitoring component 1508 depicted in FIG. 15) may monitor, up to the BD and CCE limit in the super slot, PDCCH candidates or non-overlapped CCEs for DCI, as described above.

Process 1100 may include additional aspects, such as any single aspect or any combination of aspects described below and/or in connection with one or more other processes described elsewhere herein.

In a first aspect, a value of the BD and CCE limit corresponds to a length of the super slot.

In a second aspect, alone or in combination with the first aspect, a value of the BD and CCE limit corresponds to a capability level of the UE.

In a third aspect, alone or in combination with one or more of the first and second aspects, a value of the BD and CCE limit is greater than 44 monitored PDCCH candidates or non-overlapped CCEs.

In a fourth aspect, alone or in combination with one or more of the first through third aspects, the BD and CCE limit applies to only one slot of the super slot.

In a fifth aspect, alone or in combination with one or more of the first through fourth aspects, the monitoring occurs in only one slot of the super slot, and the BD and CCE limit applies to the only one slot.

In a sixth aspect, alone or in combination with one or more of the first through fifth aspects, the only one slot is a starting slot of the super slot.

In a seventh aspect, alone or in combination with one or more of the first through sixth aspects, the only one slot is an end slot of the super slot.

In an eighth aspect, alone or in combination with one or more of the first through seventh aspects, the indication specifies that the BD and CCE limit is to be equally split among all slots of the super slot.

In a ninth aspect, alone or in combination with one or more of the first through eighth aspects, the indication specifies that the BD and CCE limit is to be proportionally split among all slots of the super slot based at least in part on a quantity of symbols of each slot of the super slot.

In a tenth aspect, alone or in combination with one or more of the first through ninth aspects, process 1100 includes transmitting an indication of a capability of the UE for a BD and CCE limit.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
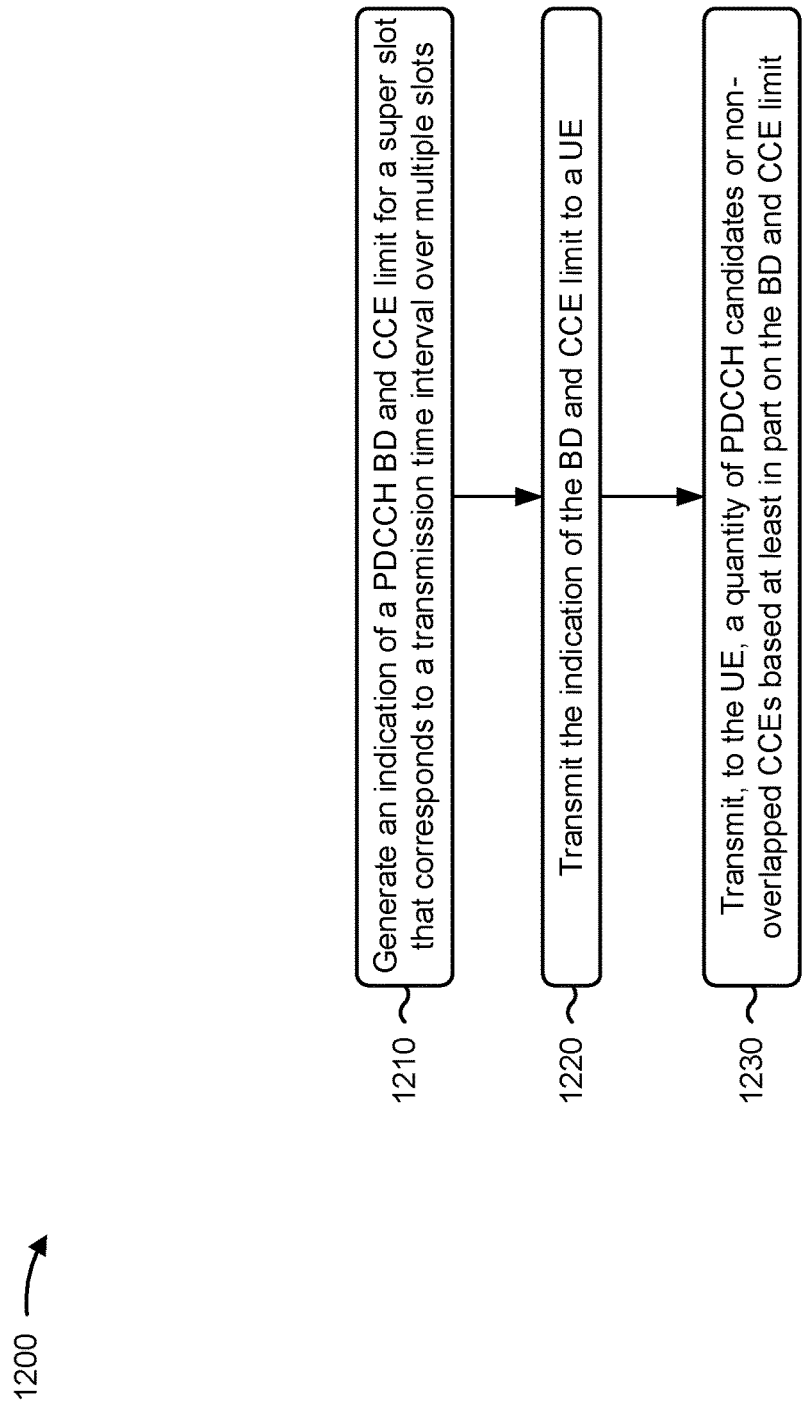
FIG. 12 is a diagram illustrating an example process performed, for example, by a base station, in accordance with various aspects of the present disclosure.

FIG. 12 is a diagram illustrating an example process 1200 performed, for example, by a base station, in accordance with various aspects of the present disclosure. Example process 1200 is an example where the base station (e.g., base station 110 depicted in FIGS. 1-2, BS 810 depicted in FIG. 8) performs operations associated with PDCCH monitoring.

As shown in FIG. 12, in some aspects, process 1200 may include generating an indication of a PDCCH BD and CCE limit for a super slot that corresponds to a TTI over multiple slots (block 1210). For example, the base station (e.g., using generation component 1608 depicted in FIG. 16) may generate an indication of a PDCCH BD and CCE limit for a super slot that corresponds to a TTI over multiple slots, as described above.

As further shown in FIG. 12, in some aspects, process 1200 may include transmitting the indication of the BD and CCE limit to a UE (block 1220). For example, the UE (e.g., using transmission component 1604 depicted in FIG. 16) may transmit the indication of the BD and CCE limit to a UE, as described above.

As further shown in FIG. 12, in some aspects, process 1200 may include transmitting, to the UE, a quantity of PDCCH candidates or non-overlapped CCEs based at least in part on the BD and CCE limit (block 1230). For example, the UE (e.g., using transmission component 1604 depicted in FIG. 16) may transmit, to the UE, a quantity of PDCCH candidates or non-overlapped CCEs based at least in part on the BD and CCE limit, as described above.

Process 1200 may include additional aspects, such as any single aspect or any combination of aspects described below and/or in connection with one or more other processes described elsewhere herein.

In a first aspect, a value of the BD and CCE limit corresponds to a length of the super slot.

In a second aspect, alone or in combination with the first aspect, a value of the BD and CCE limit is based at least in part on an indication of a capability level of the UE that is received from the UE.

In a third aspect, alone or in combination with one or more of the first and second aspects, a value of the BD and CCE limit is greater than 44 monitored PDCCH candidates or non-overlapped CCEs.

In a fourth aspect, alone or in combination with one or more of the first through third aspects, the indication indicates that the monitoring by the UE is to occur in only one slot of the super slot, and the BD and CCE limit applies to the only one slot.

In a fifth aspect, alone or in combination with one or more of the first through fourth aspects, the indication specifies that the BD and CCE limit is to be equally split among all slots of the super slot.

In a sixth aspect, alone or in combination with one or more of the first through fifth aspects, the indication specifies that the BD and CCE limit is to be proportionally split among all slots of the super slot based at least in part on a quantity of symbols of each slot of the super slot.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
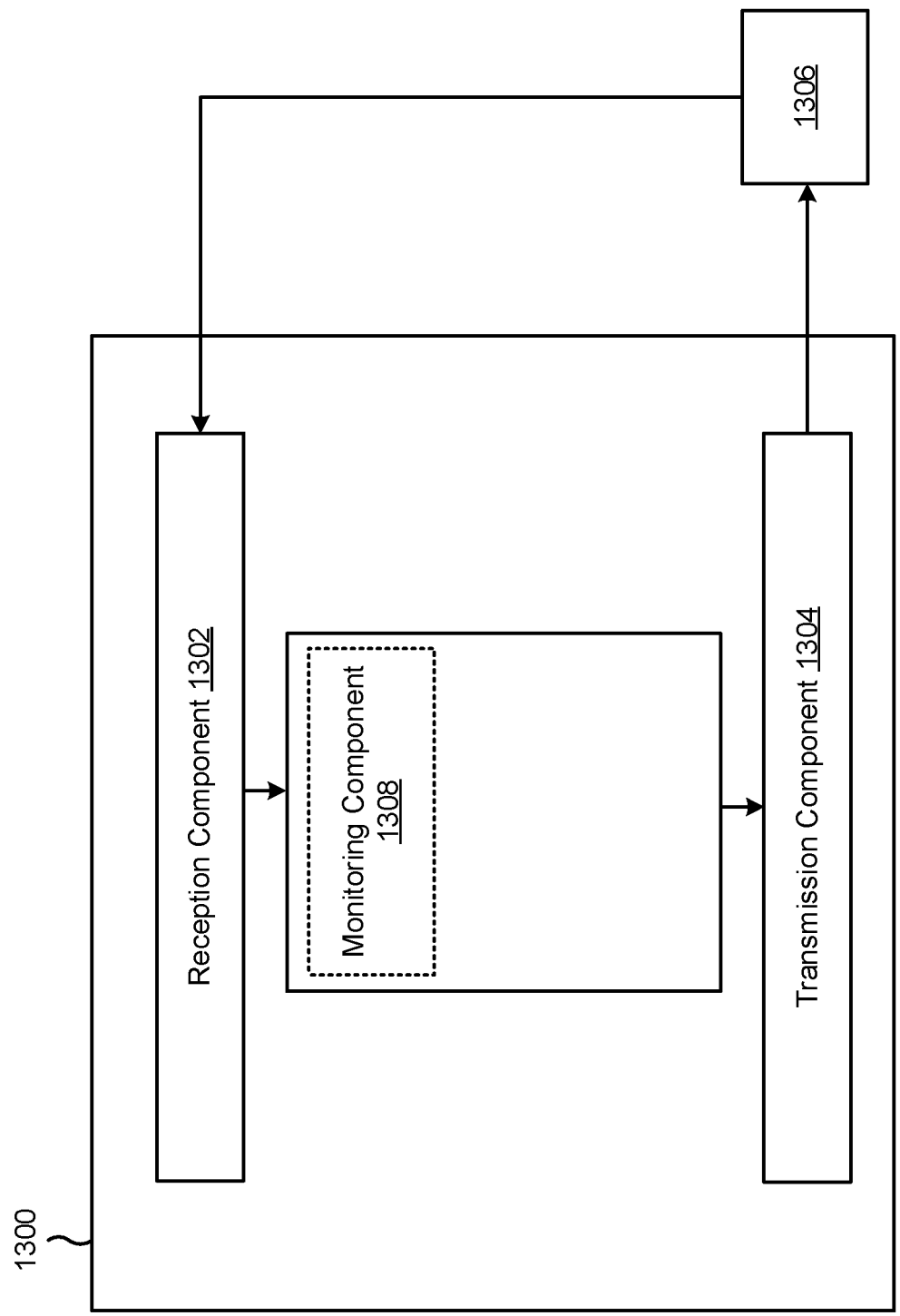
FIGS. 13-16 are block diagrams of example apparatuses for wireless communication, in accordance with various aspects of the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a monitoring component 1308, among other examples.

In some aspects, the apparatus 1300 may be configured to perform one or more operations described herein in connection with FIGS. 1-8. Additionally, or alternatively, the apparatus 1300 may be configured to perform one or more processes described herein, such as process 900 of FIG. 9. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The reception component 1302 may receive an indication of a span pattern for a super slot that corresponds to a TTI over multiple slots. The monitoring component 1308 may monitor, within a span that is specified by the span pattern and that extends across a slot boundary in the super slot, PDCCH candidates for DCI. The transmission component 1304 may transmit a capability of the UE for a span pattern.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
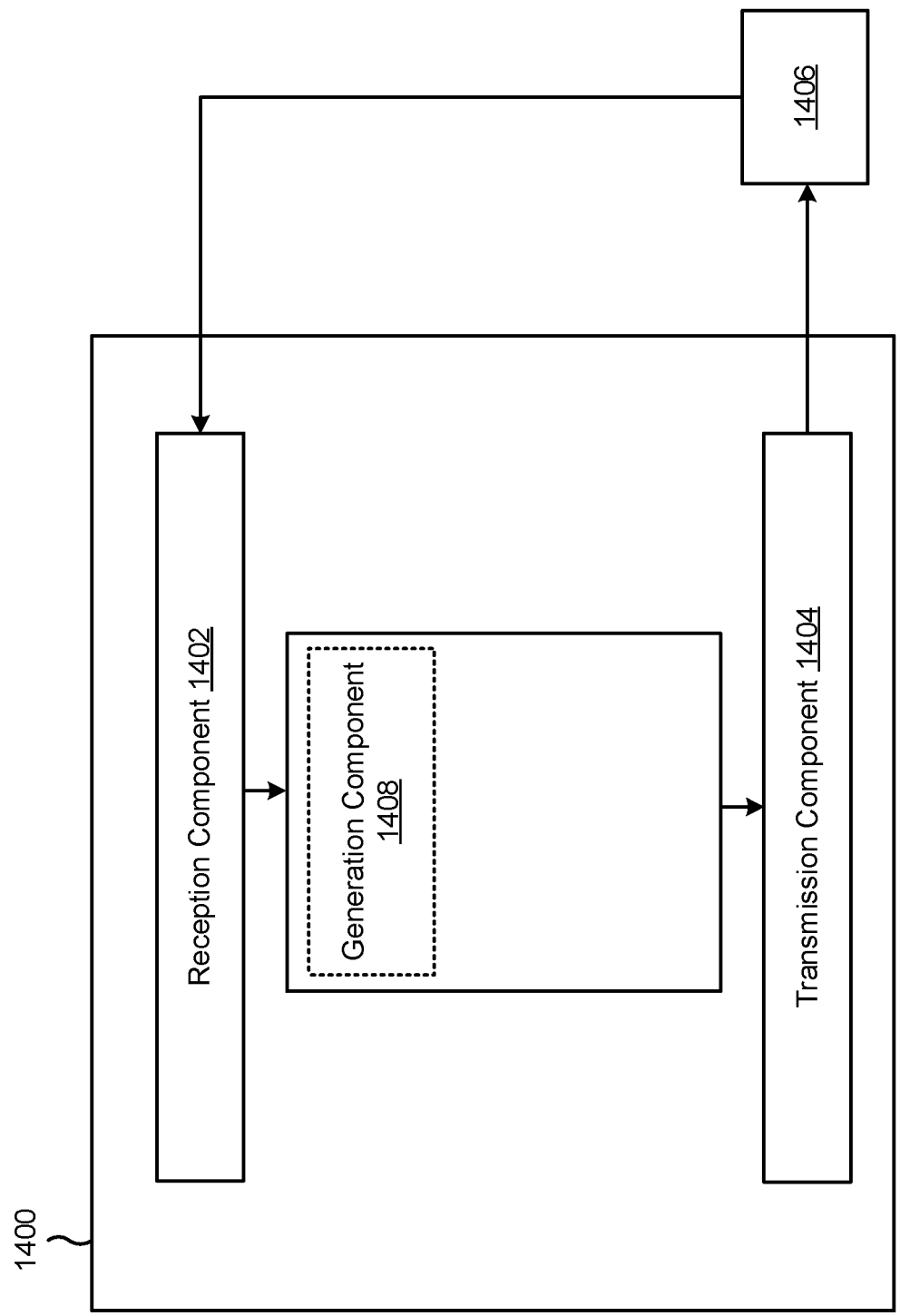

FIG. 14 is a block diagram of an example apparatus 1400 for wireless communication. The apparatus 1400 may be a base station, or a base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a generation component 1408, among other examples.

In some aspects, the apparatus 1400 may be configured to perform one or more operations described herein in connection with FIGS. 1-8. Additionally, or alternatively, the apparatus 1400 may be configured to perform one or more processes described herein, such as process 1000 of FIG. 10. In some aspects, the apparatus 1400 and/or one or more components shown in FIG. 14 may include one or more components of the base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the base station described above in connection with FIG. 2. In some aspects, the transmission component 1404 may be co-located with the reception component 1402 in a transceiver.

The generation component 1408 may generate an indication of a span pattern for a super slot that corresponds to a TTI over multiple slots. The transmission component 1404 may transmit the indication of the span pattern to UE. The transmission component 1404 may transmit, to the UE in a span that is specified by the span pattern and that extends across a slot boundary in the super slot, PDCCH candidates that include DCI.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
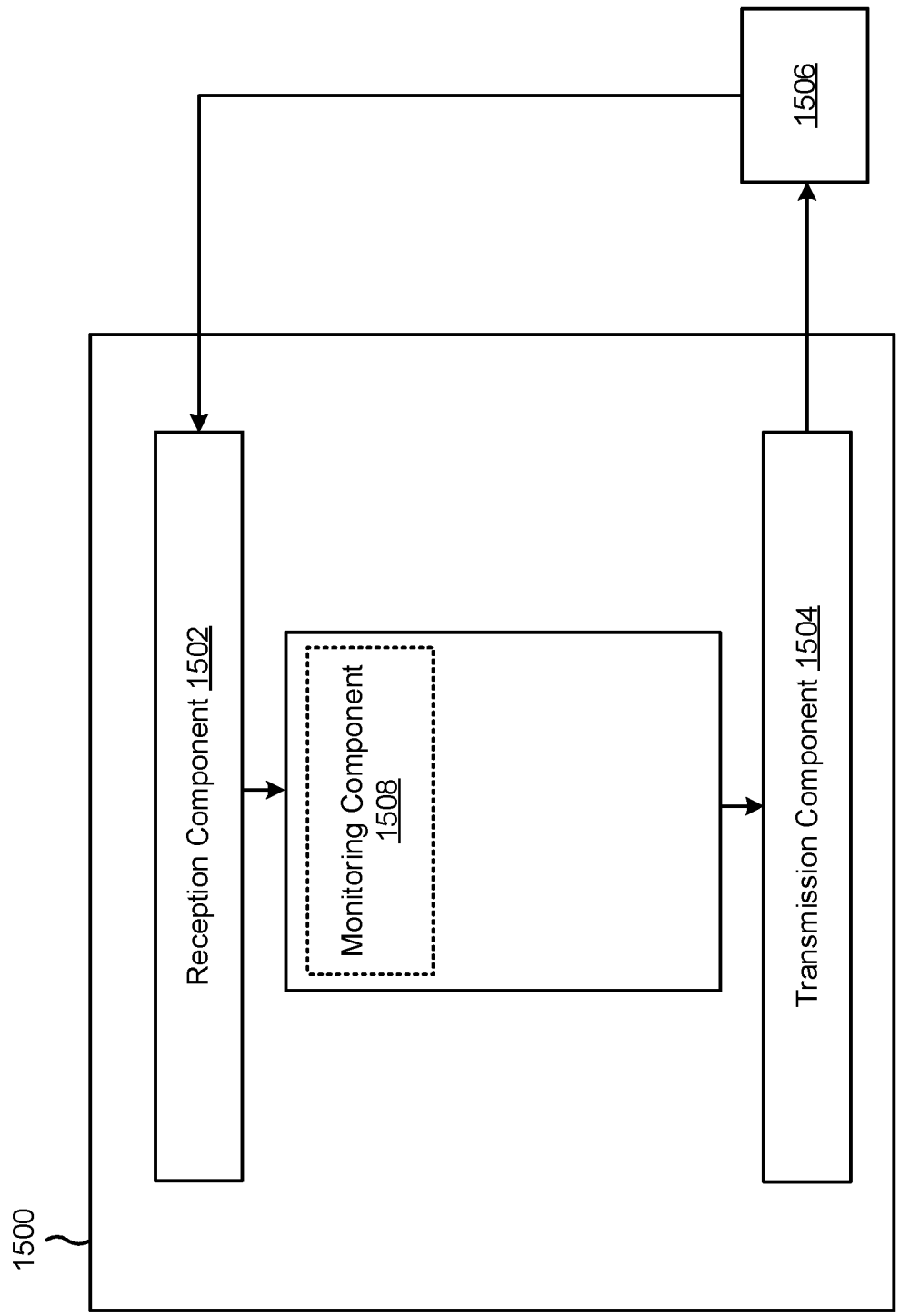

FIG. 15 is a block diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a monitoring component 1508, among other examples.

In some aspects, the apparatus 1500 may be configured to perform one or more operations described herein in connection with FIGS. 1-8. Additionally, or alternatively, the apparatus 1500 may be configured to perform one or more processes described herein, such as process 1100 of FIG. 11. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG.

2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The reception component 1502 may receive an indication of a PDCCH BD and CCE limit for a super slot that corresponds to a TTI over multiple slots. The monitoring component 1508 may monitor, up to the BD and CCE limit in the super slot, PDCCH candidates or non-overlapped CCEs for DCI. The transmission component 1504 may transmit an indication of a capability of the UE for a BD and CCE limit.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
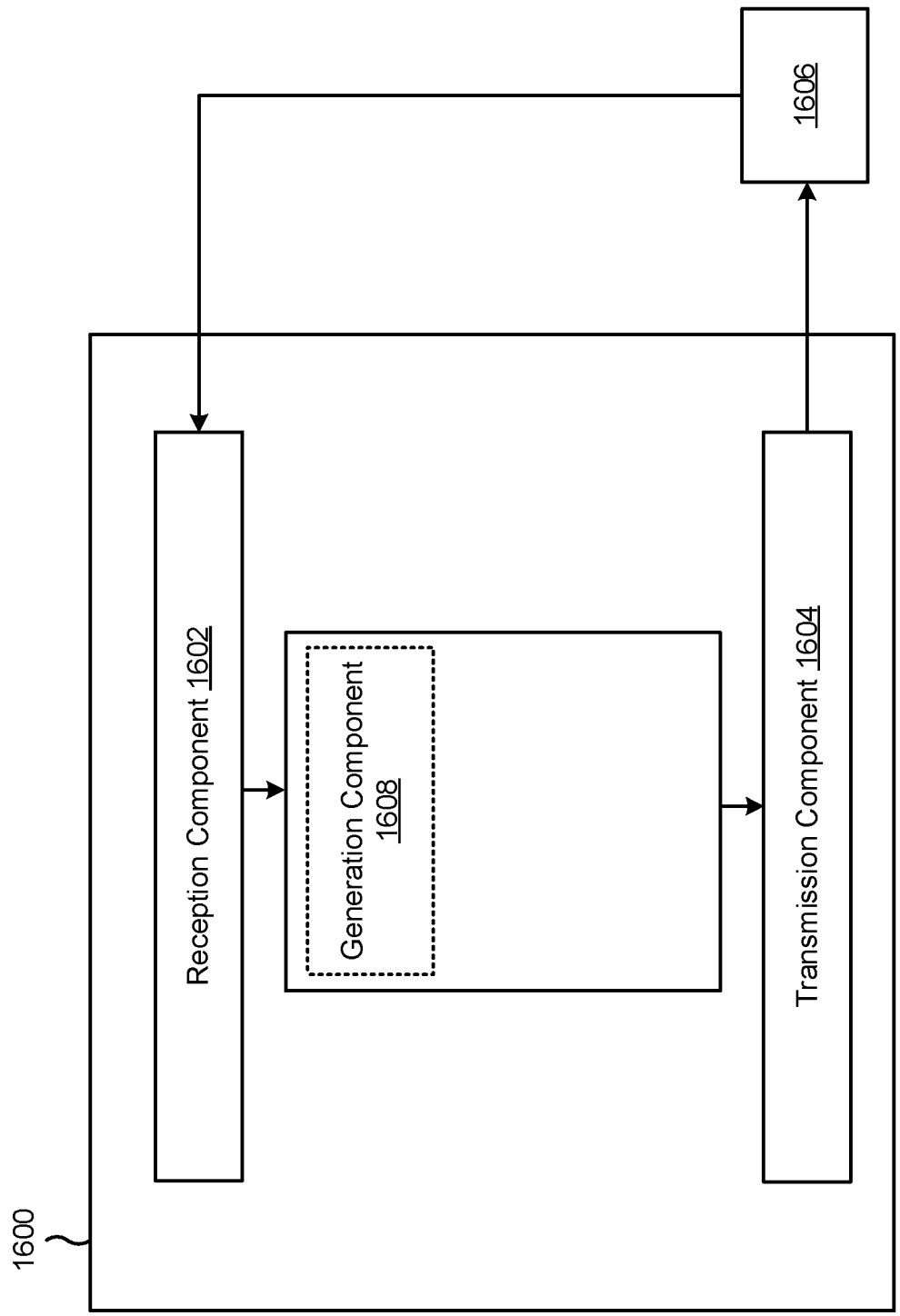

FIG. 16 is a block diagram of an example apparatus 1600 for wireless communication. The apparatus 1600 may be a base station, or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include a generation component 1608, among other examples.

In some aspects, the apparatus 1600 may be configured to perform one or more operations described herein in connection with FIGS. 1-8. Additionally, or alternatively, the apparatus 1600 may be configured to perform one or more processes described herein, such as process 1200 of FIG. 12. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be co-located with the reception component 1602 in a transceiver.

The generation component 1608 may generate an indication of a PDCCH BD and CCE limit for a super slot that corresponds to a TTI over multiple slots. The transmission component 1604 may transmit the indication of the BD and CCE limit to a UE. The transmission component 1604 may transmit, to the UE, a quantity of PDCCH candidates or non-overlapped CCEs based at least in part on the BD and CCE limit.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

The following provides an overview of some aspects of the present disclosure:

Aspect 1: A method of wireless communication performed by a user equipment (UE), comprising: receiving an indication of a span pattern for a super slot that corresponds to a transmission time interval over multiple slots; and monitoring, within a span that is specified by the span pattern and that extends across a slot boundary in the super slot, physical downlink control channel (PDCCH) candidates for downlink control information (DCI).

Aspect 2: The method of aspect 1, wherein the span pattern includes a span duration and a minimum span separation gap.

Aspect 3: The method of aspect 2, wherein the span duration is greater than 3 symbols.

Aspect 4: The method of aspect 2, wherein the span duration is greater than a length of a slot.

Aspect 5: The method of aspect 2, wherein the span duration or the minimum span separation gap corresponds to a length of the super slot.

Aspect 6: The method of aspect 2, wherein the span duration or the minimum span separation gap corresponds to a capability level of the UE.

Aspect 7: The method of any of aspects 1-6, further comprising transmitting a capability of the UE for a span pattern.

Aspect 8: A method of wireless communication performed by a base station, comprising: generating an indication of a span pattern for a super slot that corresponds to a transmission time interval over multiple slots; transmitting the indication of the span pattern to a user equipment (UE); and transmitting, to the UE in a span that is specified by the span pattern and that extends across a slot boundary in the super slot, physical downlink control channel (PDCCH) candidates that include downlink control information (DCI).

Aspect 9: The method of aspect 8, wherein the span pattern includes a span duration and a minimum span separation gap.

Aspect 10: The method of aspect 9, wherein the span duration is greater than 3 symbols.

Aspect 11: The method of aspect 9, wherein the span duration is greater than a length of a slot.

Aspect 12: The method of aspect 9, wherein the span duration or the minimum span separation gap corresponds to a length of the super slot.

Aspect 13: The method of aspect 9, wherein the span duration or the minimum span separation gap is based at least in part on an indication of a capability level of the UE that is received from the UE.

Aspect 14: A method of wireless communication performed by a user equipment (UE), comprising: receiving an indication of a physical downlink control channel (PDCCH) blind decode (BD) and control channel element (CCE) limit for a super slot that corresponds to a transmission time interval over multiple slots; and monitoring, up to the BD and CCE limit in the super slot, PDCCH candidates or non-overlapped CCEs for downlink control information (DCI).

Aspect 15: The method of aspect 14, wherein a value of the BD and CCE limit corresponds to a length of the super slot.

Aspect 16: The method of aspect 14, wherein a value of the BD and CCE limit corresponds to a capability level of the UE.

Aspect 17: The method of aspect 14, wherein a value of the BD and CCE limit is greater than 44 monitored PDCCH candidates or non-overlapped CCEs.

Aspect 18: The method of any of aspects 14-17, wherein the BD and CCE limit applies to only one slot of the super slot.

Aspect 19: The method of any of aspects 14-17, wherein the monitoring occurs in only one slot of the super slot, and wherein the BD and CCE limit applies to the only one slot.

Aspect 20: The method of aspect 19, wherein the only one slot is a starting slot of the super slot.

Aspect 21: The method of aspect 19, wherein the only one slot is an end slot of the super slot.

Aspect 22: The method of any of aspects 14-17, wherein the indication specifies that the BD and CCE limit is to be equally split among all slots of the super slot.

Aspect 23: The method of any of aspects 14-17, wherein the indication specifies that the BD and CCE limit is to be proportionally split among all slots of the super slot based at least in part on a quantity of symbols of each slot of the super slot.

Aspect 24: The method of any of aspects 14-23, further comprising transmitting an indication of a capability of the UE for a BD and CCE limit.

Aspect 25: A method of wireless communication performed by a base station, comprising: generating an indication of a physical downlink control channel (PDCCH) blind decode (BD) and control channel element (CCE) limit for a super slot that corresponds to a transmission time interval over multiple slots; transmitting the indication of the BD and CCE limit to a user equipment (UE); and transmitting, to the UE, a quantity of PDCCH candidates or non-overlapped CCEs based at least in part on the BD and CCE limit.

Aspect 26: The method of aspect 25, wherein a value of the BD and CCE limit corresponds to a length of the super slot.

Aspect 27: The method of aspect 25 or 26, wherein a value of the BD and CCE limit is based at least in part on an indication of a capability level of the UE that is received from the UE.

Aspect 28: The method of any of aspects 25-27, wherein a value of the BD and CCE limit is greater than 44 monitored PDCCH candidates or non-overlapped CCEs.

Aspect 29: The method of any of aspects 25-28, wherein the indication indicates that the monitoring by the UE is to occur in only one slot of the super slot, and wherein the BD and CCE limit applies to the only one slot.

Aspect 30: The method of any of aspects 25-28, wherein the indication specifies that the BD and CCE limit is to be equally split among all slots of the super slot.

Aspect 31: The method of any of aspects 25-28, wherein the indication specifies that the BD and CCE limit is to be proportionally split among all slots of the super slot based at least in part on a quantity of symbols of each slot of the super slot.

Aspect 32: An apparatus for wireless communication at a device, comprising a processor; memory coupled with the processor; and instructions stored in the memory and executable by the processor to cause the apparatus to perform the method of one or more aspects of aspects 1-31.

Aspect 33: A device for wireless communication, comprising a memory and one or more processors coupled to the memory, the memory and the one or more processors configured to perform the method of one or more aspects of aspects 1-31.

Aspect 34: An apparatus for wireless communication, comprising at least one means for performing the method of one or more aspects of aspects 1-31.

Aspect 35: A non-transitory computer-readable medium storing code for wireless communication, the code comprising instructions executable by a processor to perform the method of one or more aspects of aspects 1-31.

Aspect 36: A non-transitory computer-readable medium storing a set of instructions for wireless communication, the set of instructions comprising one or more instructions that, when executed by one or more processors of a device, cause the device to perform the method of one or more aspects of aspects 1-31.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors coupled to the memory, the one or more processors configured to:
      receive an indication of a span pattern for a super slot that corresponds to a transmission time interval over multiple slots; and
      monitor, within a span that is specified by the span pattern and that extends across a slot boundary in the super slot, physical downlink control channel (PDCCH) candidates for downlink control information (DCI).

2. The UE of claim 1, wherein the span pattern includes a span duration and a minimum span separation gap.

3. The UE of claim 2, wherein the span duration is greater than 3 symbols.

4. The UE of claim 2, wherein the span duration is greater than a length of a slot.

5. The UE of claim 2, wherein the span duration or the minimum span separation gap corresponds to a length of the super slot.

6. The UE of claim 2, wherein the span duration or the minimum span separation gap corresponds to a capability level of the UE.

7. The UE of claim 1, wherein the one or more processors are further configured to transmit a capability of the UE for a span pattern.

8. A base station for wireless communication, comprising:
a memory; and
one or more processors coupled to the memory, the one or more processors configured to:
generate an indication of a span pattern for a super slot that corresponds to a transmission time interval over multiple slots;
transmit the indication of the span pattern to a user equipment (UE); and
transmit, to the UE in a span that is specified by the span pattern and that extends across a slot boundary in the super slot, physical downlink control channel (PDCCH) candidates that include downlink control information (DCI).

9. The base station of claim 8, wherein the span pattern includes a span duration and a minimum span separation gap.

10. The base station of claim 9, wherein the span duration is greater than 3 symbols.

11. The base station of claim 9, wherein the span duration is greater than a length of a slot.

12. The base station of claim 9, wherein the span duration or the minimum span separation gap corresponds to a length of the super slot.

13. The base station of claim 9, wherein the span duration or the minimum span separation gap is based at least in part on an indication of a capability level of the UE that is received from the UE.

14. A user equipment (UE) for wireless communication, comprising:
a memory; and
one or more processors coupled to the memory, the one or more processors configured to:
receive an indication of a physical downlink control channel (PDCCH) blind decode (BD) and control channel element (CCE) limit for a super slot that corresponds to a transmission time interval over multiple slots; and
monitor, up to the BD and CCE limit in the super slot, PDCCH candidates or non-overlapped CCEs for downlink control information (DCI), wherein the monitoring extends across a slot boundary in the super slot, or wherein the BD and CCE limit applies to only one slot of the super slot.

15. The UE of claim 14, wherein a value of the BD and CCE limit corresponds to a length of the super slot.

16. The UE of claim 14, wherein a value of the BD and CCE limit corresponds to a capability level of the UE.

17. The UE of claim 14, wherein a value of the BD and CCE limit is greater than 44 monitored PDCCH candidates or non-overlapped CCEs.

18. The UE of claim 14, wherein the BD and CCE limit applies to only one slot of the super slot.

19. The UE of claim 14, wherein the one or more processors, to monitor the PDCCH candidates or non-overlapped CCEs, are configured to monitor in only one slot of the super slot, and wherein the BD and CCE limit applies to the only one slot.

20. The UE of claim 19, wherein the only one slot is a starting slot of the super slot.

21. The UE of claim 19, wherein the only one slot is an end slot of the super slot.

22. The UE of claim 14, wherein the indication specifies that the BD and CCE limit is to be equally split among all slots of the super slot.

23. The UE of claim 14, wherein the indication specifies that the BD and CCE limit is to be proportionally split among all slots of the super slot based at least in part on a quantity of symbols of each slot of the super slot.

24. The UE of claim 14, wherein the one or more processors are further configured to transmit an indication of a capability of the UE for a BD and CCE limit.

25. A base station for wireless communication, comprising:
a memory; and
one or more processors coupled to the memory, the one or more processors configured to:
generate an indication of a physical downlink control channel (PDCCH) blind decode (BD) and control channel element (CCE) limit for a super slot that corresponds to a transmission time interval over multiple slots;
transmit the indication of the BD and CCE limit to a user equipment (UE); and
transmit, to the UE, a quantity of PDCCH candidates or non-overlapped CCEs based at least in part on the BD and CCE limit, wherein the indication indicates that a monitoring of the PDCCH candidates or the non-overlapped CCEs extends across a slot boundary in the super slot, or that the BD and CCE limit applies to only one slot of the super slot.

26. The base station of claim 25, wherein a value of the BD and CCE limit corresponds to a length of the super slot.

27. The base station of claim 25, wherein a value of the BD and CCE limit is based at least in part on an indication of a capability level of the UE that is received from the UE.

28. The base station of claim 25, wherein a value of the BD and CCE limit is greater than 44 monitored PDCCH candidates or non-overlapped CCEs.

29. The base station of claim 25, wherein the indication indicates that the monitoring by the UE is to occur in only one slot of the super slot, and wherein the BD and CCE limit applies to the only one slot.

30. The base station of claim 25, wherein the indication specifies that the BD and CCE limit is to be equally split among all slots of the super slot.

31. The base station of claim 25, wherein the indication specifies that the BD and CCE limit is to be proportionally split among all slots of the super slot based at least in part on a quantity of symbols of each slot of the super slot.

* * * * *